(12) United States Patent
Lee et al.

(10) Patent No.: US 9,377,920 B2
(45) Date of Patent: Jun. 28, 2016

(54) ELECTROMAGNETIC INDUCTION PANEL STRUCTURE AND METHOD OF MANUFACTURING THE SAME, AND ELECTROMAGNETIC HANDWRITING INPUT DEVICE

(71) Applicant: Wacom Co., Ltd., Saitama (JP)

(72) Inventors: Wen-Chieh Lee, Hsinchu County (TW); Chia-Jui Yeh, Hsinchu County (TW); Shang-Jen Hsu, Hsinchu County (TW)

(73) Assignee: Wacom Co., Ltd., Saitama (JP)

( * ) Notice: Subject to any disclaimer, the term of this patent is extended or adjusted under 35 U.S.C. 154(b) by 338 days.

(21) Appl. No.: 13/933,232

(22) Filed: Jul. 2, 2013

(65) Prior Publication Data
US 2014/0347313 A1 Nov. 27, 2014

(30) Foreign Application Priority Data
May 22, 2013 (TW) .............................. 102118053 A

(51) Int. Cl.
*G06F 3/045* (2006.01)
*G06F 3/046* (2006.01)
*G06F 3/0354* (2013.01)

(52) U.S. Cl.
CPC ............ *G06F 3/046* (2013.01); *G06F 3/03545* (2013.01); *G06F 2203/04103* (2013.01); *Y10T 29/4902* (2015.01)

(58) Field of Classification Search
CPC ........ G06F 3/044; G06F 3/045; G06F 3/0412
USPC ...................... 345/173–179; 178/18.01–18.04
See application file for complete search history.

(56) References Cited

U.S. PATENT DOCUMENTS 5,867,151 A * 2/1999 Nakai ..................... G06F 3/041
                                                        178/18.01
5,995,172 A * 11/1999 Ikeda .................. G02F 1/13338
                                                        349/12

(Continued)

FOREIGN PATENT DOCUMENTS

JP        06-230881 A      8/1994
JP        08-221176 A      8/1996

(Continued)

OTHER PUBLICATIONS

Taiwanese Office Action dated Feb. 20, 2015, for corresponding TW Application No. 102118053, 6 pages.

*Primary Examiner* — Kimnhung Nguyen
(74) *Attorney, Agent, or Firm* — Seed Intellectual Property Law Group PLLC

(57) ABSTRACT

An electromagnetic induction panel structure includes a multilayer substrate, a first cover unit and a second cover unit. The multilayer substrate includes a first outermost lateral conductive layer and a second outermost lateral conductive layer respectively disposed on two opposite outermost surfaces thereof. The first cover unit is disposed on the first outermost lateral conductive layer. The second cover unit is disposed on the second outermost lateral conductive layer. For example, the first cover unit includes a first insulating layer directly formed on the first outermost lateral conductive layer for directly contacting the first outermost lateral conductive layer. The second cover unit includes a second insulating layer directly formed on the second outermost lateral conductive layer for directly contacting the second outermost lateral conductive layer. The second cover unit includes a waveabsorbing material layer directly formed on the second insulating layer for directly contacting the second insulating layer.

20 Claims, 21 Drawing Sheets

(56) References Cited

U.S. PATENT DOCUMENTS

| | | | |
|---|---|---|---|
| 6,646,697 B1 * | 11/2003 | Sekiguchi | G04G 9/0035 349/73 |
| 8,810,521 B2 * | 8/2014 | Ito | G02B 6/0081 345/102 |
| 2010/0156829 A1 * | 6/2010 | Shimodaira | G06F 3/0317 345/173 |
| 2010/0177054 A1 * | 7/2010 | Iida | G02B 26/004 345/173 |

FOREIGN PATENT DOCUMENTS

| | | |
|---|---|---|
| JP | 2009-003796 A | 1/2009 |
| JP | 2012-247852 A | 12/2012 |
| TW | M405597 U1 | 6/2011 |
| TW | 201211962 A1 | 3/2012 |

\* cited by examiner

ELECTROMAGNETIC INDUCTION PANEL STRUCTURE AND METHOD OF MANUFACTURING THE SAME, AND ELECTROMAGNETIC HANDWRITING INPUT DEVICE

BACKGROUND OF THE INVENTION

1. Field of the Invention

The instant disclosure relates to an electromagnetic induction panel structure and a method of manufacturing the same, and an electromagnetic handwriting input device, and more particularly to an electromagnetic induction panel structure and a method of manufacturing the same, and an electromagnetic handwriting input device for reducing the whole thickness and achieving the miniaturization requirement.

2. Description of Related Art

Commercial products of a digital tablet or a digitizer usually include a stylus or an electromagnetic pen as a pointer and a digitizer or digital tablet. An electromagnetic pen usually has a circuit with capacitors and inductors. One way to display the width variation of the trace of the pointer resulting from the pressure applied on the digital tablet by the pointer on a display is to change the inductance as well as the frequency emitted by the pointer through the variation of the contact force applied on the digital tablet by the pointer. A digitizer often comprises signal detection and processing circuits including signal amplifiers, an analog to digital converter, a micro controller unit or a central processing unit, and a plurality of sensor coils or antennas on printed circuit boards to detect and process electromagnetic signals from the electromagnetic pen so as to transmit signals of coordinates, trace or frequency variation of the electromagnetic pen to a host and to show on a display.

SUMMARY OF THE INVENTION

One aspect of the instant disclosure relates to an electromagnetic induction panel structure and a method of manufacturing the same, and an electromagnetic handwriting input device for reducing the whole thickness and achieving the miniaturization requirement One of the embodiments of the instant disclosure provides an electromagnetic induction panel structure, comprising: a multilayer substrate, a first cover unit and a second cover unit. The multilayer substrate includes a first outermost lateral conductive layer and a second outermost lateral conductive layer respectively disposed on two opposite outermost surfaces of the multilayer substrate. The first cover unit is disposed on the first outermost lateral conductive layer of the multilayer substrate. The second cover unit is disposed on the second outermost lateral conductive layer of the multilayer substrate, wherein the second cover unit includes a wave-absorbing material layer.

Another one of the embodiments of the instant disclosure provides a method of manufacturing an electromagnetic induction panel structure, comprising: providing a multilayer substrate, wherein the multilayer substrate includes a first outermost lateral conductive layer and a second outermost lateral conductive layer respectively disposed on two opposite outermost surfaces of the multilayer substrate; disposing a first cover unit on the first outermost lateral conductive layer of the multilayer substrate; and then disposing a second cover unit on the second outermost lateral conductive layer of the multilayer substrate, wherein the second cover unit includes a wave-absorbing material layer.

Yet another one of the embodiments of the instant disclosure provides an electromagnetic handwriting input device, comprising: an electromagnetic induction panel structure, an external casing and a control circuit board. The electromagnetic induction panel structure includes a multilayer substrate, a first cover unit and a second cover unit, wherein the multilayer substrate includes a first outermost lateral conductive layer and a second outermost lateral conductive layer respectively disposed on two opposite outermost surfaces of the multilayer substrate, the first cover unit is disposed on the first outermost lateral conductive layer of the multilayer substrate, the second cover unit is disposed on the second outermost lateral conductive layer of the multilayer substrate, and the second cover unit includes a wave-absorbing material layer. The external casing has a writing surface formed thereon for an electromagnetic pen to write on the writing surface, wherein an emitting electromagnetic wave directly generated by the electromagnetic pen or a reflected electromagnetic wave indirectly generated from the electromagnetic pen is detected by the electromagnetic induction panel structure to obtain an electromagnetic wave signal. The control circuit board is electrically connected to the electromagnetic induction panel structure for receiving the electromagnetic wave signal of the electromagnetic induction panel structure, wherein both the electromagnetic induction panel structure and the control circuit board are disposed inside the external casing.

Therefore, the multilayer substrate includes a first outermost lateral conductive layer and a second outermost lateral conductive layer respectively disposed on two opposite outermost surfaces thereof, the first cover unit includes a first insulating layer directly formed on the first outermost lateral conductive layer for directly contacting the first outermost lateral conductive layer, and the second cover unit includes a second insulating layer directly formed on the second outermost lateral conductive layer for directly contacting the second outermost lateral conductive layer (or the second cover unit includes a second insulating layer adhesively disposed on the second outermost lateral conductive layer through a second adhesive layer, or the wave-absorbing material layer is adhesively disposed on the second outmost lateral conductive layer through a second adhesive layer having an insulation property for placing the second insulating layer between the wave-absorbing material layer and the second outmost lateral conductive layer), so that the whole thickness of the electromagnetic handwriting input device using the electromagnetic induction panel structure can be decreased for achieving the miniaturization requirement.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

First Embodiment

Figure 1:
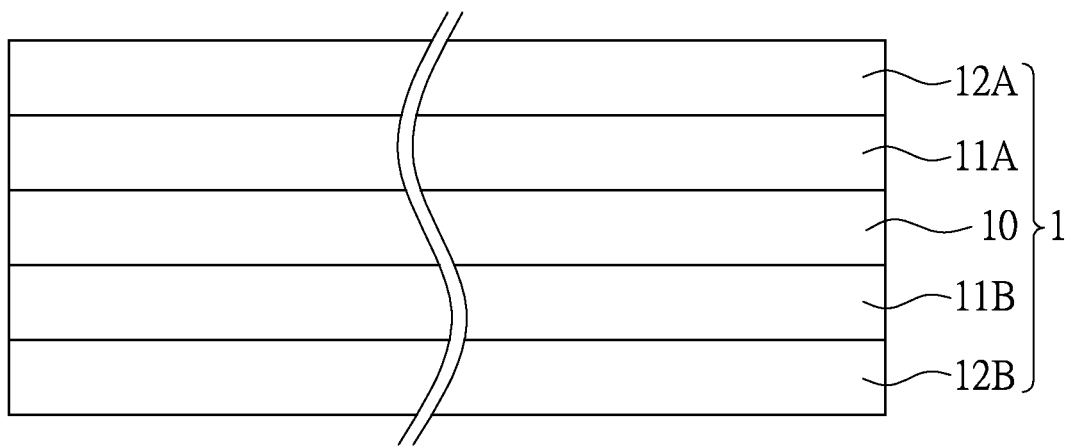
FIG. 1 shows a lateral, schematic view of the multilayer substrate of the electromagnetic induction panel structure according to the first to the sixth embodiments of the instant disclosure.
Figure 2A:
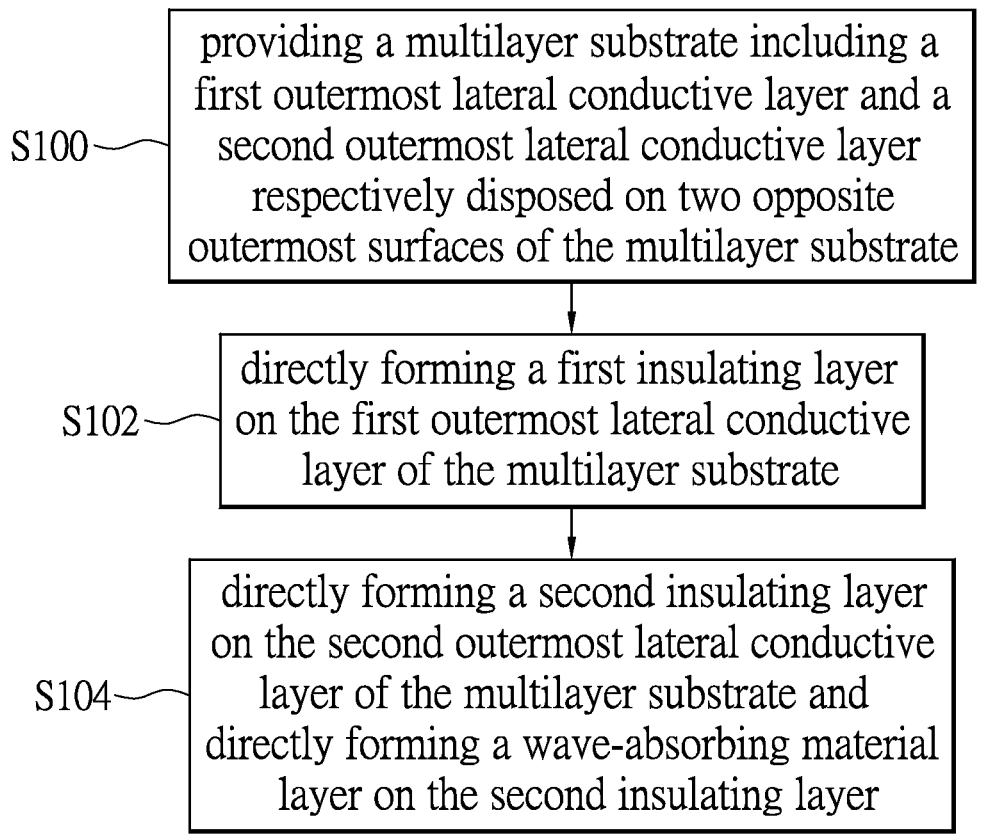
FIG. 2A shows a flowchart of the method of manufacturing an electromagnetic induction panel structure according to the first embodiment of the instant disclosure.
Figure 2B:
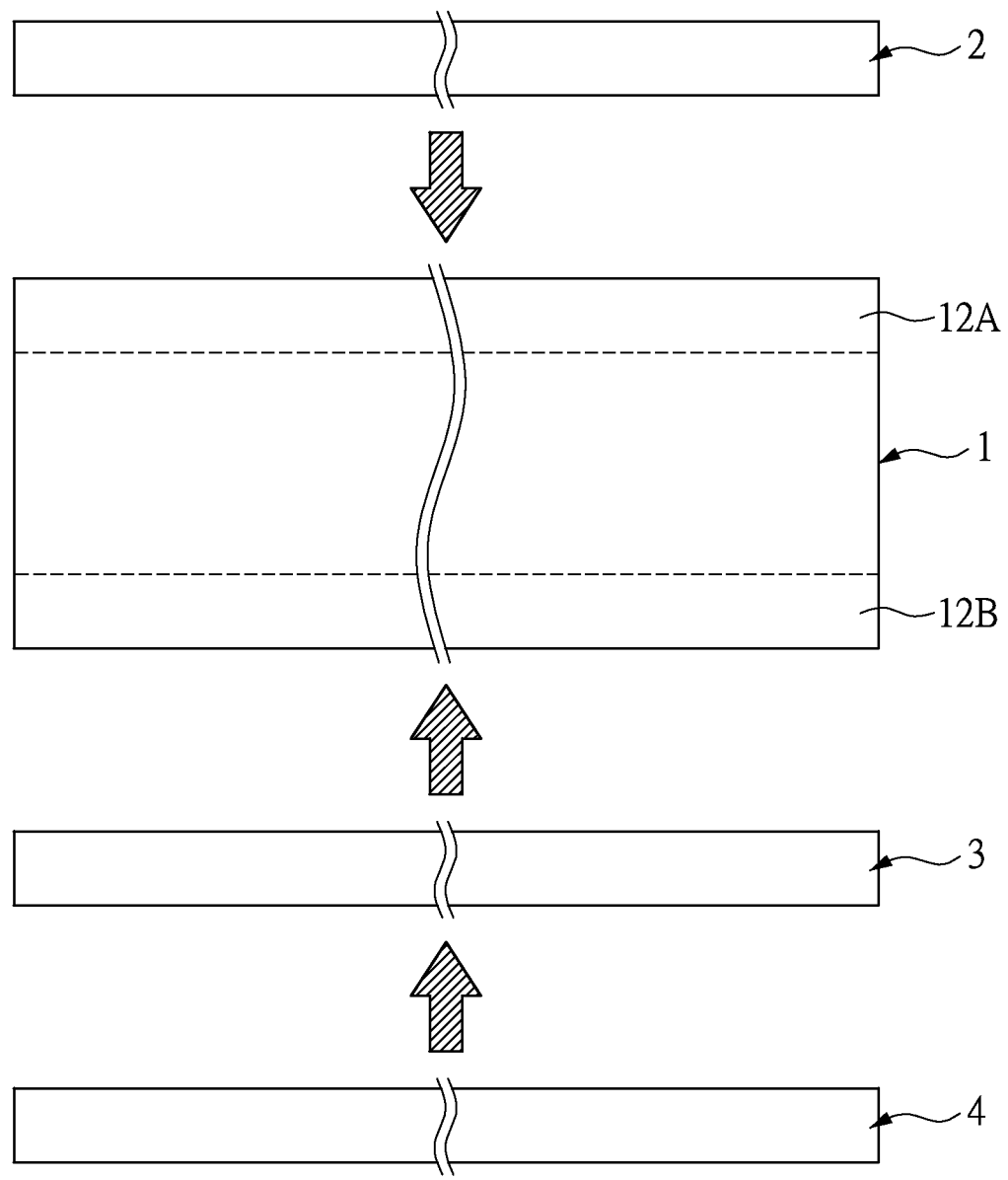
FIG. 2B shows a lateral, schematic view of the method of manufacturing an electromagnetic induction panel structure according to the first embodiment of the instant disclosure.
Figure 2C:
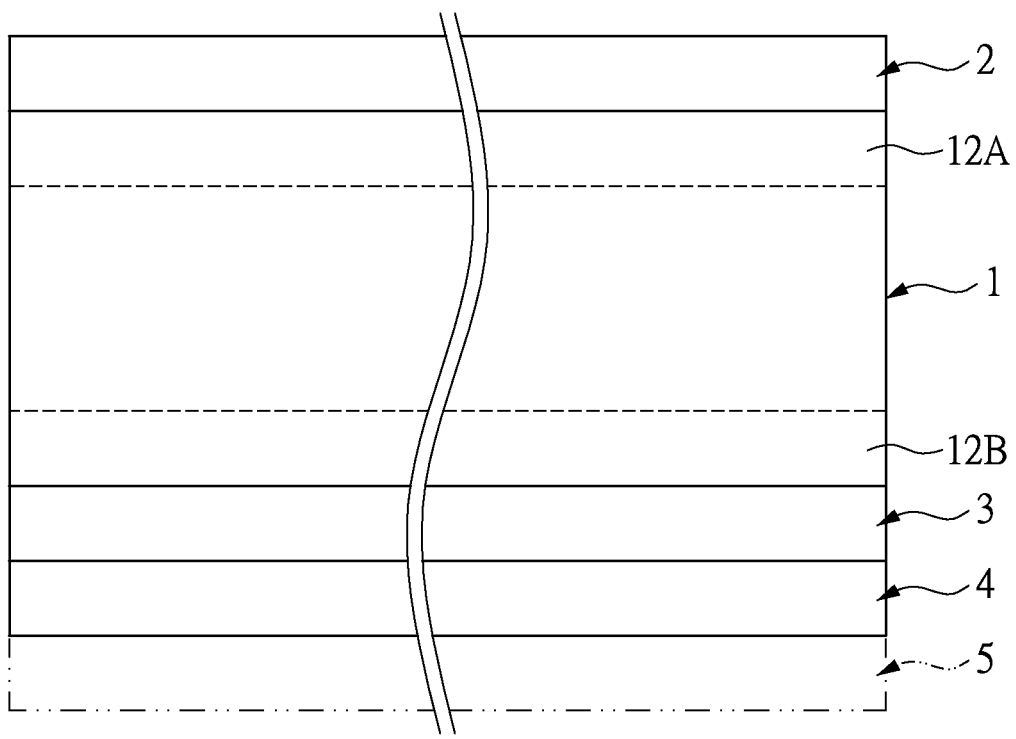
FIG. 2C shows a lateral, schematic view of the electromagnetic induction panel structure according to the first embodiment of the instant disclosure.

Referring to FIG. 1 and FIG. 2A to FIG. 2C, where the first embodiment of the instant disclosure provides a method of manufacturing an electromagnetic induction panel structure M (or an antenna board structure), comprising the steps of: referring to FIG. 1, providing a multilayer substrate 1 including a first outermost lateral conductive layer 12A and a second outermost lateral conductive layer 12B respectively disposed on two opposite outermost surfaces of the multilayer substrate 1 (S100); referring to FIG. 2B and FIG. 2C, directly forming a first insulating layer 2 on the first outermost lateral conductive layer 12A of the multilayer substrate 1 by coating, printing or any other forming method (shown as the solid arrow in FIG. 2B) for directly contacting the first outermost lateral conductive layer 12A of the multilayer substrate 1 (S102); and then referring to FIG. 2B and FIG. 2C, directly forming a second insulating layer 3 on the second outermost lateral conductive layer 12B of the multilayer substrate 1 by coating, printing or any other forming method (shown as the solid arrow in FIG. 2B) for directly contacting the second outermost lateral conductive layer 12B of the multilayer substrate 1 and directly forming a wave-absorbing material layer 4 on the second insulating layer 3 by coating, printing or any other forming method (shown as the solid arrow in FIG. 2B) for directly contacting the second insulating layer 3 (S104). However, the above-mentioned method of the first embodiment is merely an example and is not meant to limit the instant disclosure. For example, the steps of S102 and S104 can be executed concurrently or interchanged with each other.

Referring to FIG. 1, FIG. 2B and FIG. 2C, the first embodiment of the instant disclosure can provide an electromagnetic induction panel structure M through the steps from S100 to S104. The electromagnetic induction panel structure M comprises a multilayer substrate 1, a first cover unit and a second cover unit. The multilayer substrate 1 includes a first outermost lateral conductive layer 12A and a second outermost lateral conductive layer 12B respectively disposed on two opposite outermost surfaces of the multilayer substrate 1. In addition, the first cover unit is disposed on the first outermost lateral conductive layer 12A of the multilayer substrate 1, and the first cover unit includes a first insulating layer 2 directly formed on the first outermost lateral conductive layer 12A of the multilayer substrate 1 without using any extra auxiliary adhesive layer for directly contacting the first outermost lateral conductive layer 12A of the multilayer substrate 1. Moreover, the second cover unit is disposed on the second outermost lateral conductive layer 12B of the multilayer substrate 1. The second cover unit includes a second insulating layer 3 directly formed on the second outermost lateral conductive layer 12B of the multilayer substrate 1 without using any extra auxiliary adhesive layer for directly contacting the second outermost lateral conductive layer 12B of the multilayer substrate 1. The second cover unit includes a wave-absorbing material layer 4 directly formed on the second insulating layer 3 for directly contacting the second insulating layer 3. Furthermore, referring to FIG. 2C, the second cover unit further includes an insulating protection layer 5 (such as a UV paint or any insulation layer) directly formed on the wave-absorbing material layer 4 for protecting the wave-absorbing material layer 4 and preventing the wave-absorbing material layer 4 from being damaged.

More precisely, in the first embodiment, because the first insulating layer 2 can be directly formed on the first outermost lateral conductive layer 12A of the multilayer substrate 1 without using any extra auxiliary adhesive layer, there is no any extra auxiliary adhesive layer used between the first insulating layer 2 and the first outermost lateral conductive layer 12A. Thus, the first embodiment of the instant disclosure can omit an extra auxiliary adhesive layer (occupied by about 15 um) for decreasing the thickness of the electromagnetic induction panel structure M. In addition, because the second insulating layer 3 can be directly formed on the second outermost lateral conductive layer 12B of the multilayer substrate 1 without using any extra auxiliary adhesive layer, there is no any extra auxiliary adhesive layer used between the second insulating layer 3 and the second outermost lateral conductive layer 12B, and the second outermost lateral conductive layer 12B and the wave-absorbing material layer 4 can share the same second insulating layer 3. Thus, the first embodiment of the instant disclosure can omit an extra auxiliary adhesive layer (occupied by about 15 um) and an extra insulating layer (occupied by about 12.5 um) for decreasing the thickness of the electromagnetic induction panel structure M. In other words, the first insulating layer 2 can be directly formed on the first outermost lateral conductive layer 12A of the multilayer substrate 1 without using any extra auxiliary adhesive layer and the second insulating layer 3 can be directly formed on the second outermost lateral conductive layer 12B of the multilayer substrate 1 without using any extra auxiliary adhesive layer, so that the first embodiment of the instant disclosure can omit two extra auxiliary adhesive layers (occupied by about 30 um) and an extra insulating layer (occupied by about 12.5 um) for reducing the thickness of the electromagnetic induction panel structure M, so as to achieve the miniaturization requirement.

For example, referring to FIG. 1 and FIG. 2C, the multilayer substrate 1 may be a flexible circuit board such as a FCCL (Flexible Copper Clad Laminate). The multilayer substrate 1 includes an insulating base layer 10, a first conductive circuit layer 11A formed on the top surface of the insulating base layer 10, and a second conductive circuit layer 11B formed on the bottom surface of the insulating base layer 10, and the first outmost lateral conductive layer 12A and the second outmost lateral conductive layer 12B are respectively formed on the first conductive circuit layer 11A and the second conductive circuit layer 11B. More precisely, the first insulating layer 2, the second insulating layer 3 and the insulating base layer 10 may be made of polyimide (PI) to form a PI layer. Both the first conductive circuit layer 11A and the second conductive circuit layer 11B may be two copper foil layers formed by etching. Both the first outmost lateral conductive layer 12A and the second outmost lateral conductive layer 12B may be two electroplating layers. The wave-absorbing material layer 4 has a high magnetic conductivity. However, the above-mentioned design for the multilayer substrate 1, the first insulating layer 2, the second insulating layer 3 and the wave-absorbing material layer 4 of the first embodiment is merely an example and is not meant to limit the instant disclosure.

Of course, the first insulating layer 2, the second insulating layer 3 and the insulating base layer 10 also can be made of one of polymethylmethacrylate (PMMA), poly vinyl chloride (PVC), polyethylene terephthalate (PET), polyethylene naphthalate (PEN), cyclic olefin copolymer (COC), poly carbonate (PC), polyethylene (PE), poly propylene (PP) and poly styrene (PS), but it is merely an example and is not meant to limit the instant disclosure. In addition, both the first conductive circuit layer 11A and the second conductive circuit layer 11B also may be two indium tin oxide conductive layers, two carbon nanotube conductive layers, two polymer conductive layers, two grapheme conductive layers, two silver paste layers or two nano silver conductive layers, but it is merely an example and is not meant to limit the instant disclosure.

More precisely, the wave-absorbing material layer 4 can be made of any high magnetic permeability material. Microwave-absorbing materials of the wave-absorbing material layer 4 include ferrites, carbon black, metal powder, polycrystal fibers and conductive polymers. The microwave-absorbing materials are mixed with adhesives at various ratios to adjust parameters of the microwave-absorbing composites. For example, there have been devised various microwave-absorbing materials, double-layer structure magnetic mediums, ferroelectric/ferromagnetic composites, Ag/ferrite composites, $Fe_3O_4$/graphite composites and ferrite/polymer composites. However, it is merely an example and is not meant to limit the instant disclosure.

Second Embodiment

Figure 3A:
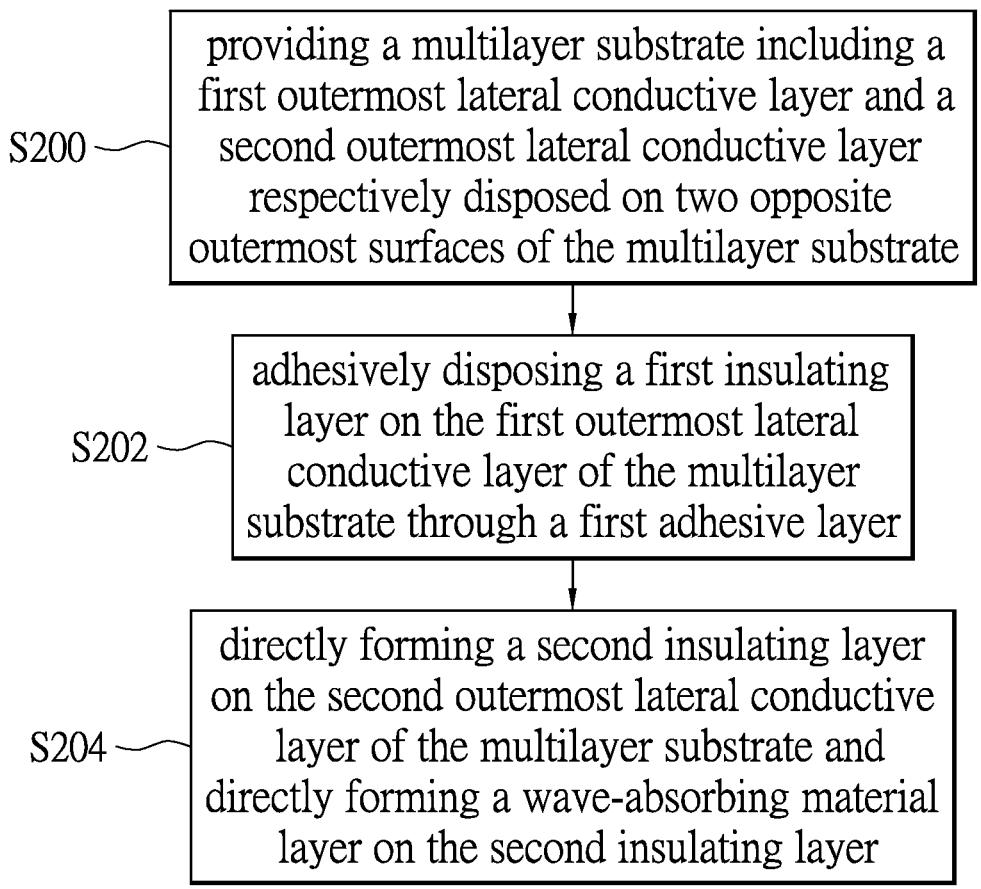
FIG. 3A shows a flowchart of the method of manufacturing an electromagnetic induction panel structure according to the second embodiment of the instant disclosure.
Figure 3B:
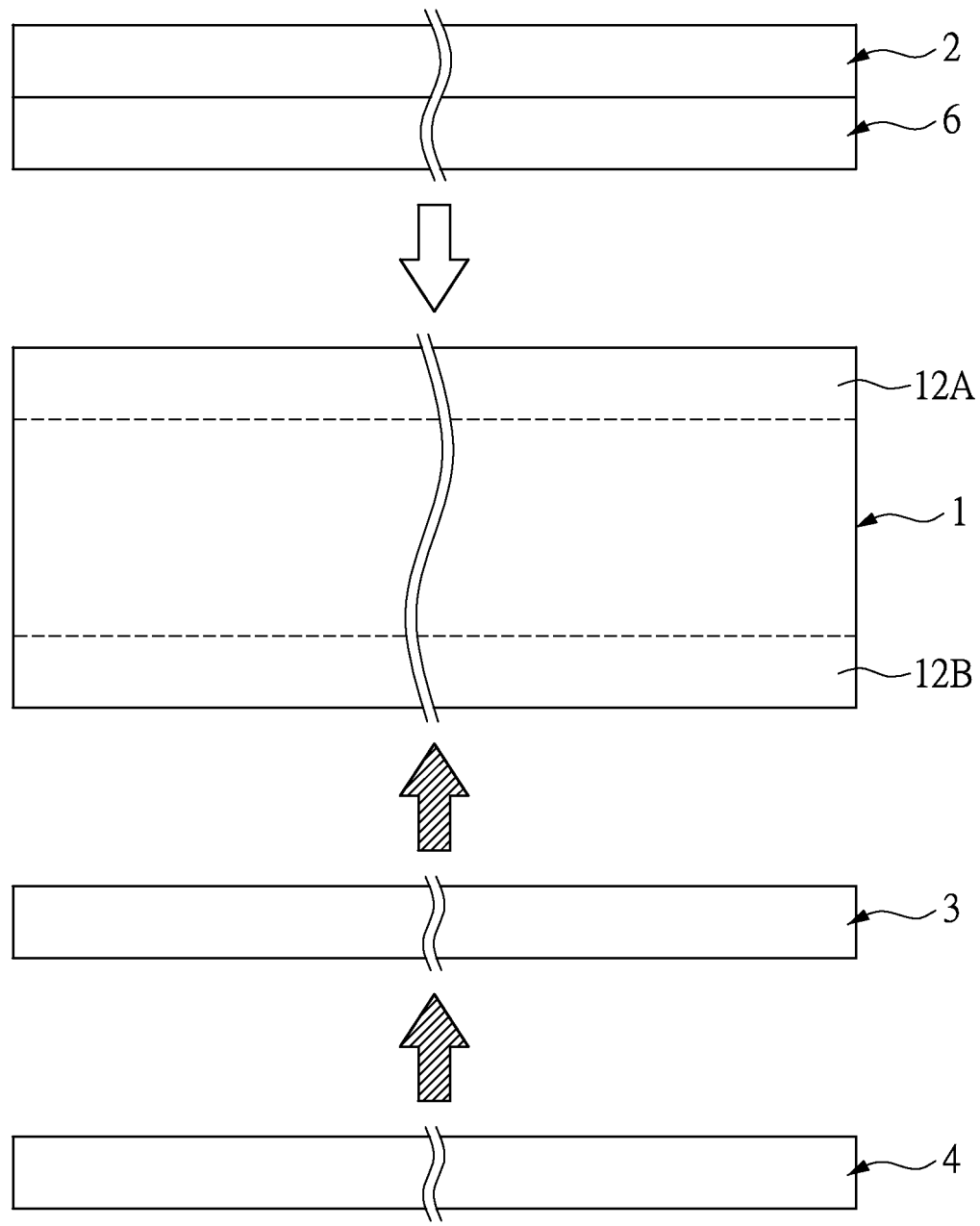
FIG. 3B shows a lateral, schematic view of the method of manufacturing an electromagnetic induction panel structure according to the second embodiment of the instant disclosure.
Figure 3C:
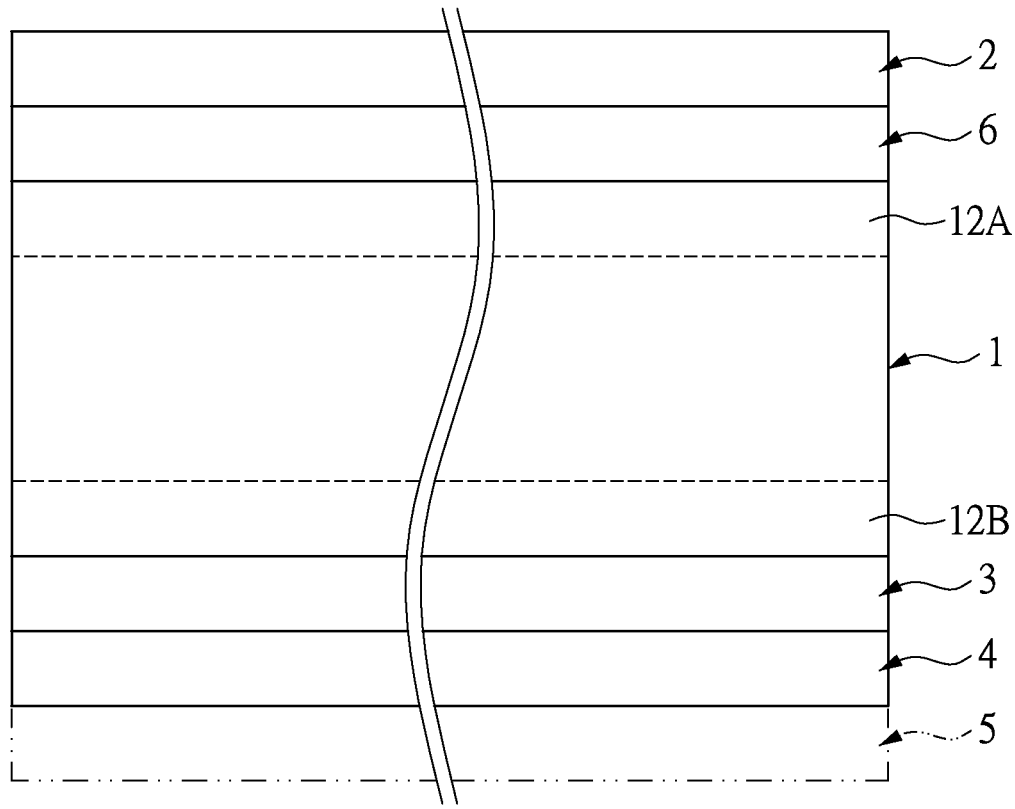
FIG. 3C shows a lateral, schematic view of the electromagnetic induction panel structure according to the second embodiment of the instant disclosure.

Referring to FIG. 1 and FIG. 3A to FIG. 3C, where the second embodiment of the instant disclosure provides a method of manufacturing an electromagnetic induction panel structure M, comprising the steps of: referring to FIG. 1, providing a multilayer substrate 1 including a first outermost lateral conductive layer 12A and a second outermost lateral conductive layer 12B respectively disposed on two opposite outermost surfaces of the multilayer substrate 1 (S200); referring to FIG. 3B and FIG. 3C, adhesively disposing a first insulating layer 2 on the first outermost lateral conductive layer 12A of the multilayer substrate 1 through a first adhesive layer 6 (shown as the hollow arrow in FIG. 3B) for placing the first adhesive layer 6 between the first insulating layer 2 and the first outermost lateral conductive layer 12A of the multilayer substrate 1 (S202); and then referring to FIG. 3B and FIG. 3C, directly forming a second insulating layer 3 on the second outermost lateral conductive layer 12B of the multilayer substrate 1 by coating, printing or any other forming method (shown as the solid arrow in FIG. 3B) for directly contacting the second outermost lateral conductive layer 12B of the multilayer substrate 1 and directly forming a wave-absorbing material layer 4 on the second insulating layer 3 by coating, printing or any other forming method (shown as the solid arrow in FIG. 3B) for directly contacting the second insulating layer 3 (S204). However, the above-mentioned method of the second embodiment is merely an example and is not meant to limit the instant disclosure. For example, the steps of S202 and S204 can be interchanged with each other.

Furthermore, comparing FIG. 3B with FIG. 2B, and comparing FIG. 3C with FIG. 2C, the difference between the second embodiment and the first embodiment is as follows: in the second embodiment, the first cover unit includes a first insulating layer 2 adhesively disposed on the first outermost lateral conductive layer 12A of the multilayer substrate 1 through a first adhesive layer 6, thus the first adhesive layer 6 is disposed between the first insulating layer 2 and the first outermost lateral conductive layer 12A of the multilayer substrate 1.

Third Embodiment

Figure 4A:
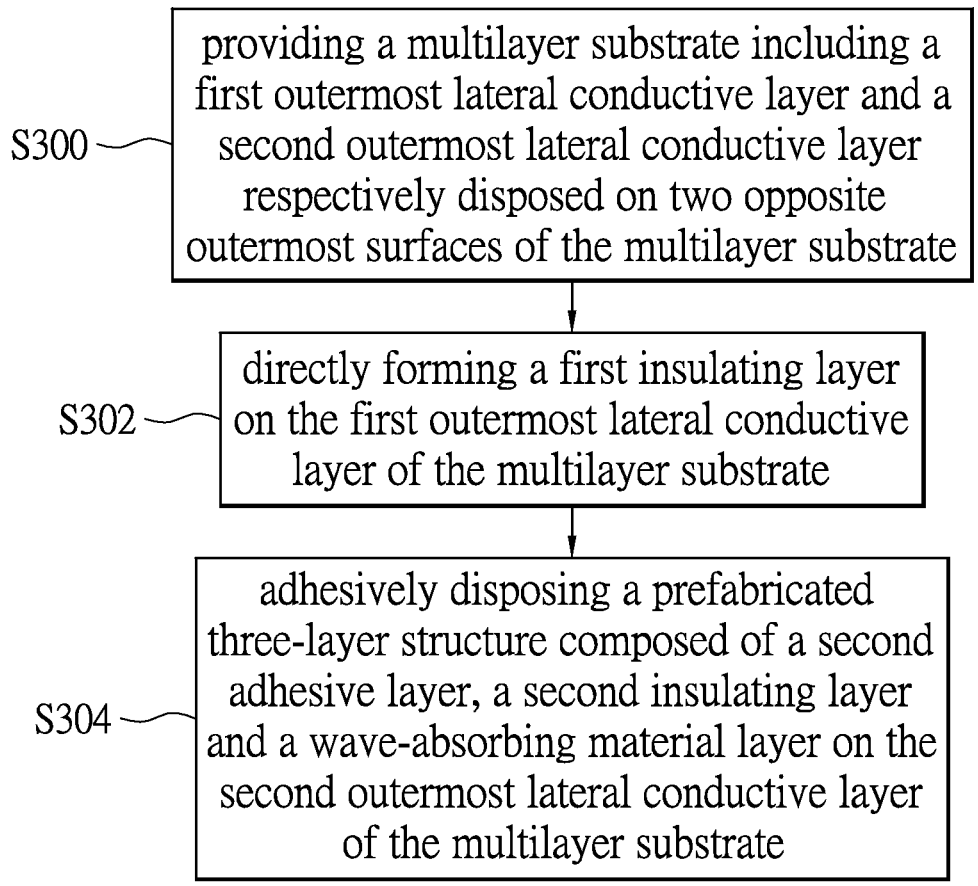
FIG. 4A shows a flowchart of the method of manufacturing an electromagnetic induction panel structure according to the third embodiment of the instant disclosure.
Figure 4B:
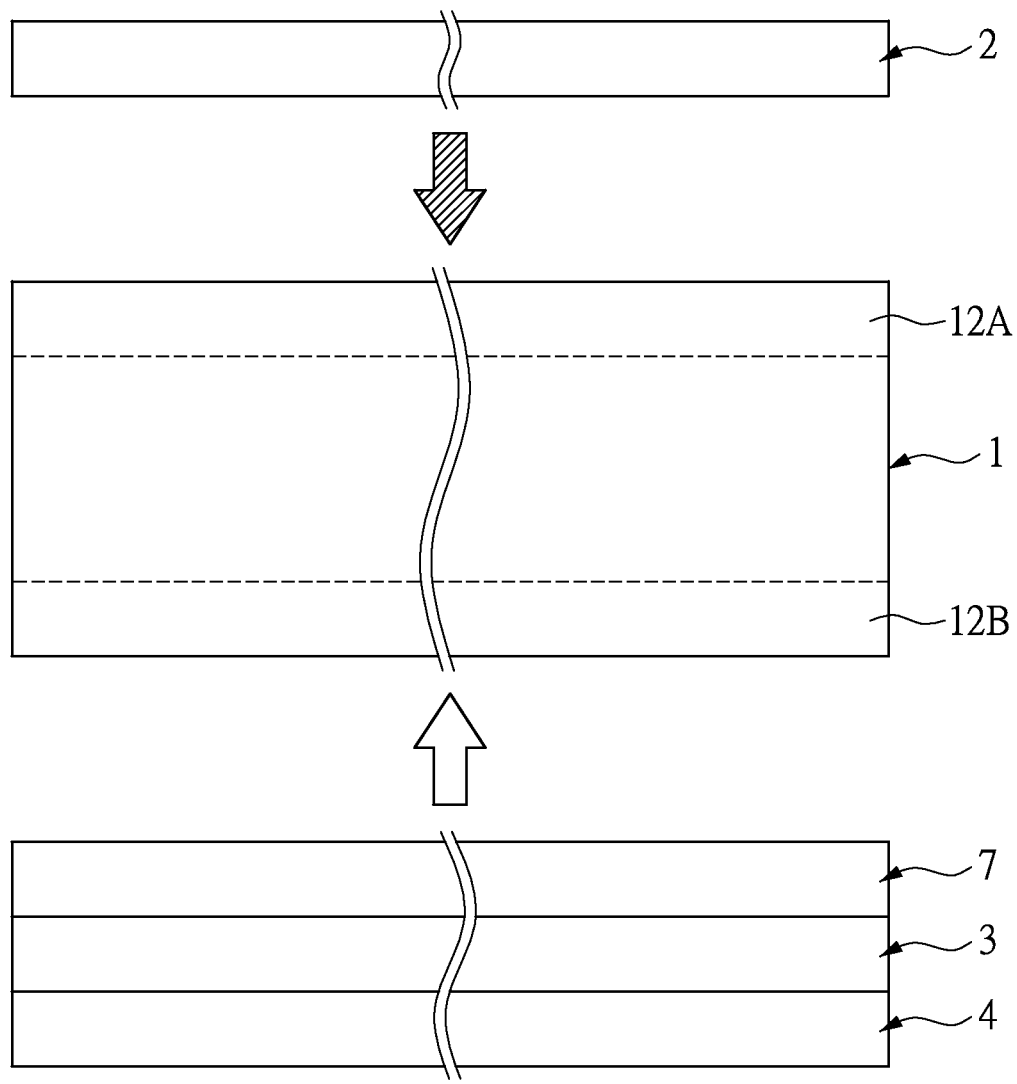
FIG. 4B shows a lateral, schematic view of the method of manufacturing an electromagnetic induction panel structure according to the third embodiment of the instant disclosure.
Figure 4C:
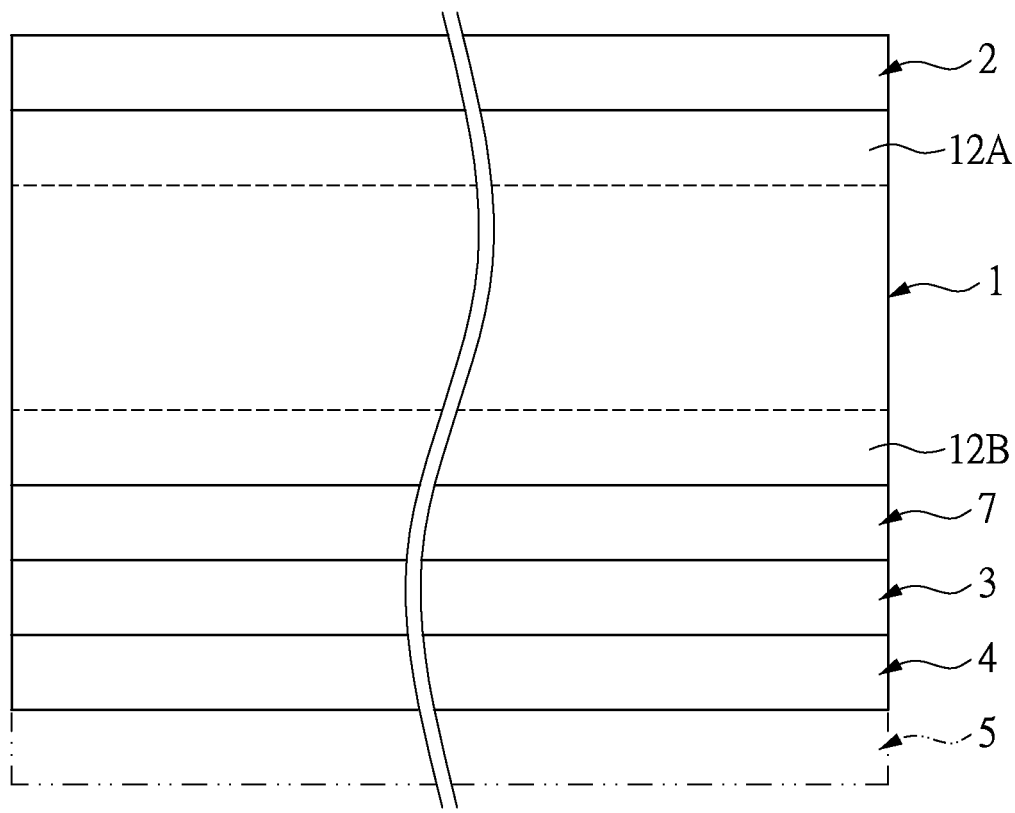
FIG. 4C shows a lateral, schematic view of the electromagnetic induction panel structure according to the third embodiment of the instant disclosure.

Referring to FIG. 1 and FIG. 4A to FIG. 4C, where the third embodiment of the instant disclosure provides a method of manufacturing an electromagnetic induction panel structure M, comprising the steps of: referring to FIG. 1, providing a multilayer substrate 1 including a first outermost lateral conductive layer 12A and a second outermost lateral conductive layer 12B respectively disposed on two opposite outermost surfaces of the multilayer substrate 1 (S300); referring to FIG. 4B and FIG. 4C, directly forming a first insulating layer 2 on the first outermost lateral conductive layer 12A of the multilayer substrate 1 by coating, printing or any other forming method (shown as the solid arrow in FIG. 4B) for directly contacting the first outermost lateral conductive layer 12A of the multilayer substrate 1 (S302); and then referring to FIG. 4B and FIG. 4C, adhesively disposing a prefabricated three-layer structure composed of a second adhesive layer 7, a second insulating layer 3 and a wave-absorbing material layer 4 on the second outermost lateral conductive layer 12B of the multilayer substrate 1 (shown as the solid arrow in FIG. 4B) for placing the second adhesive layer 7 between the second insulating layer 3 and the second outmost lateral conductive layer 12B of the multilayer substrate 1 (S304). In other words, the prefabricated three-layer structure can be composed of the second adhesive layer 7, the second insulating layer 3 and the wave-absorbing material layer 4 that are stacked on top of one another, and the prefabricated three-layer structure can be adhesively disposed on the second outermost lateral conductive layer 12B of the multilayer substrate 1 through the second adhesive layer 7. However, the above-mentioned method of the third embodiment is merely an example and is not meant to limit the instant disclosure. For example, the steps of S302 and S304 can be interchanged with each other.

Referring to FIG. 1, FIG. 4B and FIG. 4C, the third embodiment of the instant disclosure can provide an electromagnetic induction panel structure M through the steps from S300 to S304. The electromagnetic induction panel structure M comprises a multilayer substrate 1, a first cover unit and a second cover unit. The multilayer substrate 1 includes a first outermost lateral conductive layer 12A and a second outermost lateral conductive layer 12B respectively disposed on two opposite outermost surfaces of the multilayer substrate 1. In addition, the first cover unit is disposed on the first outermost lateral conductive layer 12A of the multilayer substrate 1, and the first cover unit includes a first insulating layer 2 directly formed on the first outermost lateral conductive layer 12A of the multilayer substrate 1 without using any extra auxiliary adhesive layer for directly contacting the first outermost lateral conductive layer 12A of the multilayer substrate 1. Moreover, the second cover unit is disposed on the second outermost lateral conductive layer 12B of the multilayer substrate 1. The second cover unit includes a second insulating layer 3 adhesively disposed on the second outermost lateral conductive layer 12B of the multilayer substrate 1 through a second adhesive layer 7, thus the second adhesive layer 7 can be disposed between the second insulating layer 3 and the second outmost lateral conductive layer 12B of the multilayer substrate 1. The second cover unit includes a wave-absorbing material layer 4 directly formed on the second insulating layer 3 for directly contacting the second insulating layer 3. Furthermore, referring to FIG. 4C, the second cover unit further includes an insulating protection layer 5 (such as a UV paint or any insulation layer) directly formed on the wave-absorbing material layer 4 for protecting the wave-absorbing material layer 4 and preventing the wave-absorbing material layer 4 from being damaged.

More precisely, in the third embodiment, because the first insulating layer 2 can be directly formed on the first outermost lateral conductive layer 12A of the multilayer substrate 1 without using any extra auxiliary adhesive layer, there is no any extra auxiliary adhesive layer used between the first insulating layer 2 and the first outermost lateral conductive layer 12A. Thus, the third embodiment of the instant disclosure can omit an extra auxiliary adhesive layer (occupied by about 15 um) for decreasing the thickness of the electromagnetic induction panel structure M. In addition, because the second insulating layer 3 can be adhesively disposed on the second outermost lateral conductive layer 12B of the multilayer substrate 1 through the second adhesive layer 7, the second outermost lateral conductive layer 12B and the wave-absorbing material layer 4 can share the same second insulating layer 3. Thus, the third embodiment of the instant disclosure can omit an extra insulating layer (occupied by about 12.5 um) for decreasing the thickness of the electromagnetic induction panel structure M. In other words, the first insulating layer 2 can be directly formed on the first outermost lateral conductive layer 12A of the multilayer substrate 1 without using any extra auxiliary adhesive layer and the second insulating layer 3 can be adhesively disposed on the second outermost lateral conductive layer 12B of the multilayer substrate 1 through the second adhesive layer 7, so that the third embodiment of the instant disclosure can omit an extra auxiliary adhesive layer (occupied by about 15 um) and an extra insulating layer (occupied by about 12.5 um) for reducing the thickness of the electromagnetic induction panel structure M, so as to achieve the miniaturization requirement.

Fourth Embodiment

Figure 5A:
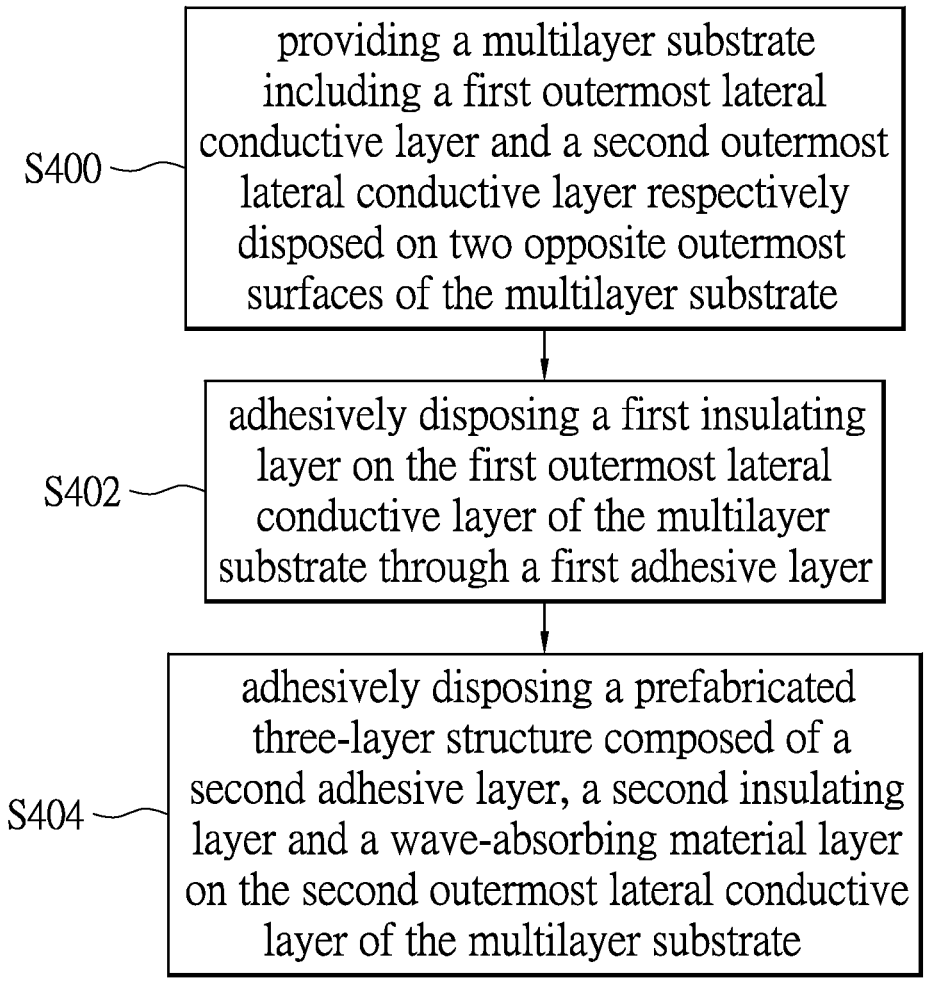
FIG. 5A shows a flowchart of the method of manufacturing an electromagnetic induction panel structure according to the fourth embodiment of the instant disclosure.
Figure 5B:
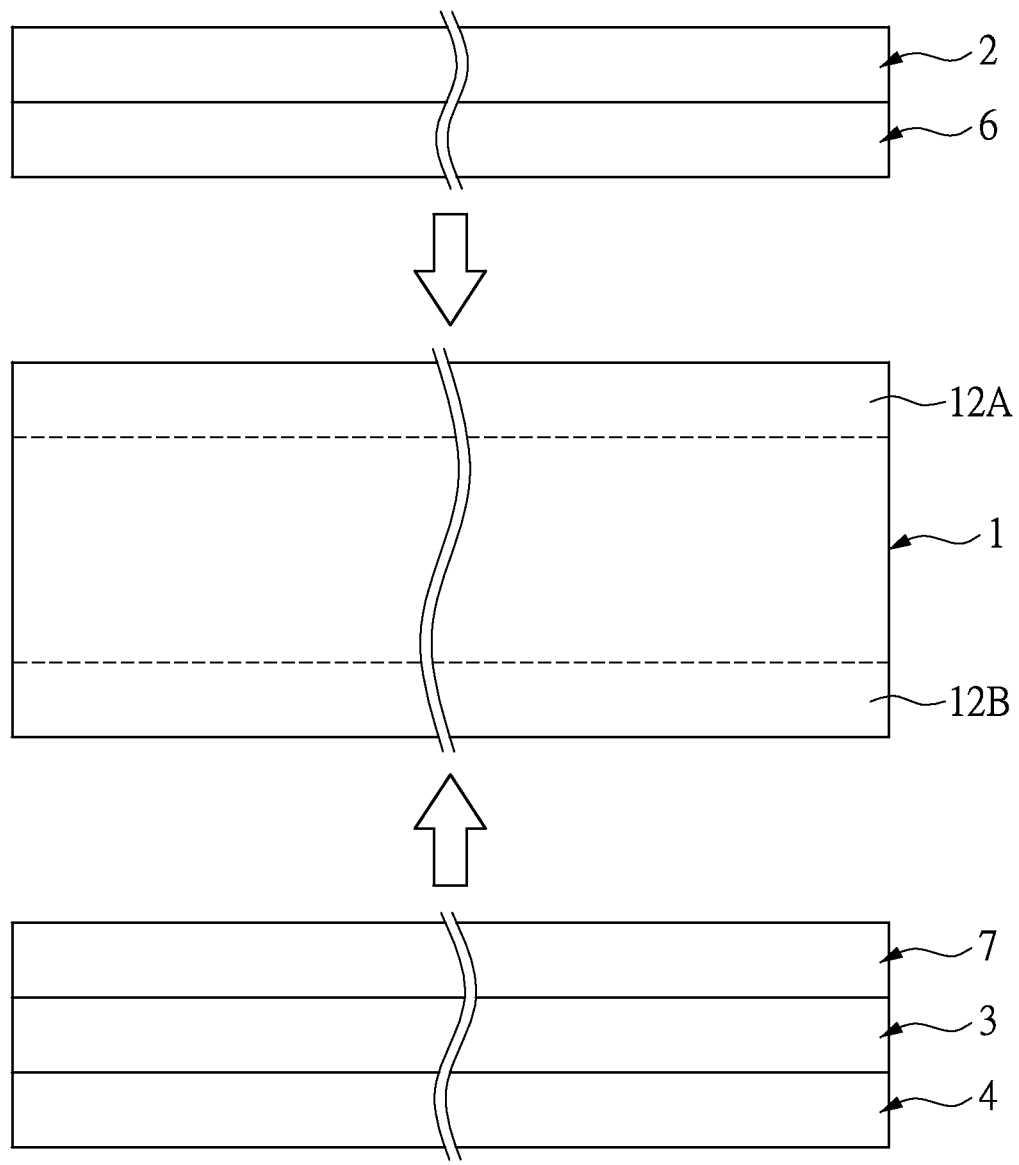
FIG. 5B shows a lateral, schematic view of the method of manufacturing an electromagnetic induction panel structure according to the fourth embodiment of the instant disclosure.
Figure 5C:
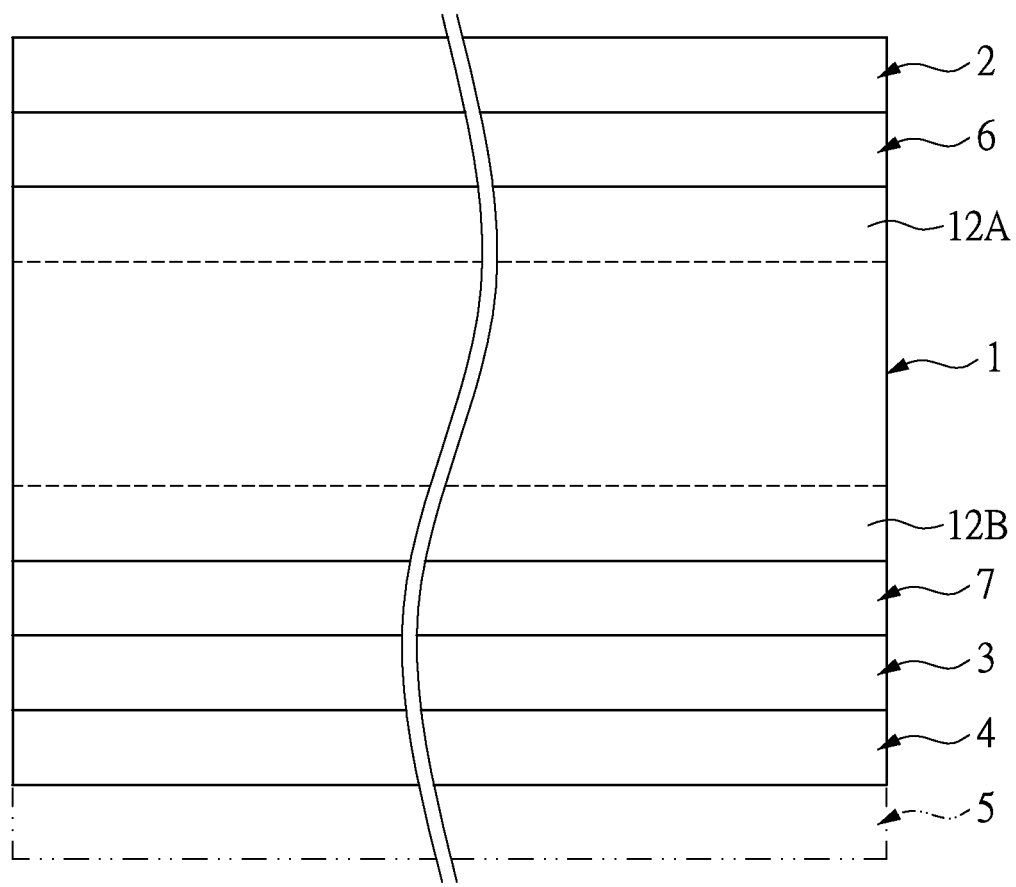
FIG. 5C shows a lateral, schematic view of the electromagnetic induction panel structure according to the fourth embodiment of the instant disclosure.

Referring to FIG. 1 and FIG. 5A to FIG. 5C, where the fourth embodiment of the instant disclosure provides a method of manufacturing an electromagnetic induction panel structure M, comprising the steps of: referring to FIG. 1, providing a multilayer substrate 1 including a first outermost lateral conductive layer 12A and a second outermost lateral conductive layer 12B respectively disposed on two opposite outermost surfaces of the multilayer substrate 1 (S400); referring to FIG. 5B and FIG. 5C, adhesively disposing a first insulating layer 2 on the first outermost lateral conductive layer 12A of the multilayer substrate 1 through a first adhesive layer 6 (shown as the hollow arrow in FIG. 5B) for placing the first adhesive layer 6 between the first insulating layer 2 and the first outermost lateral conductive layer 12A of the multilayer substrate 1 (S402); and then referring to FIG. 5B and FIG. 5C, adhesively disposing a prefabricated three-layer structure composed of a second adhesive layer 7, a second insulating layer 3 and a wave-absorbing material layer 4 on the second outermost lateral conductive layer 12B of the multilayer substrate 1 (shown as the solid arrow in FIG. 5B) for placing the second adhesive layer 7 between the second insulating layer 3 and the second outmost lateral conductive layer 12B of the multilayer substrate 1 (S404). In other words, the prefabricated three-layer structure can be composed of the second adhesive layer 7, the second insulating layer 3 and the wave-absorbing material layer 4 that are stacked on top of one another, and the prefabricated three-layer structure can be adhesively disposed on the second outermost lateral conductive layer 12B of the multilayer substrate 1 through the second adhesive layer 7. However, the above-mentioned method of the fourth embodiment is merely an example and is not meant to limit the instant disclosure. For example, the steps of S402 and S404 can be interchanged with each other.

Furthermore, comparing FIG. 5B with FIG. 4B, and comparing FIG. 5C with FIG. 4C, the difference between the fourth embodiment and the third embodiment is as follows: in the fourth embodiment, the first cover unit includes a first insulating layer 2 adhesively disposed on the first outermost lateral conductive layer 12A of the multilayer substrate 1 through a first adhesive layer 6, thus the first adhesive layer 6 is disposed between the first insulating layer 2 and the first outermost lateral conductive layer 12A of the multilayer substrate 1.

Fifth Embodiment

Figure 6A:
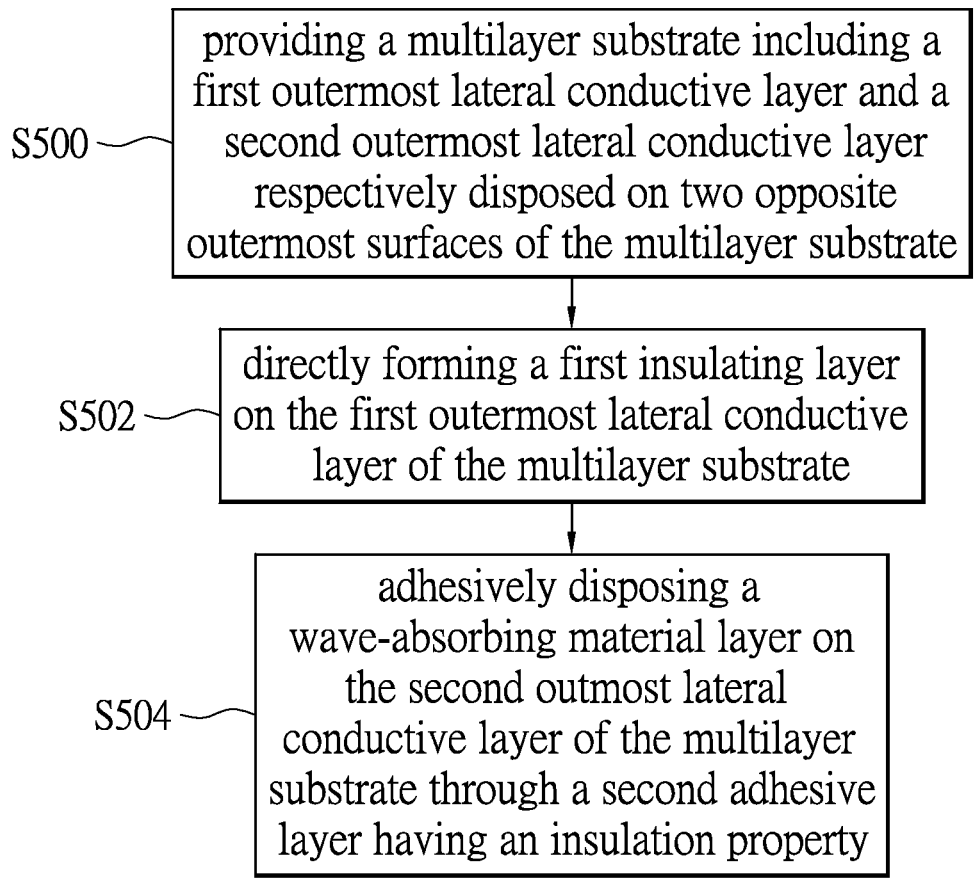
FIG. 6A shows a flowchart of the method of manufacturing an electromagnetic induction panel structure according to the fifth embodiment of the instant disclosure.
Figure 6B:
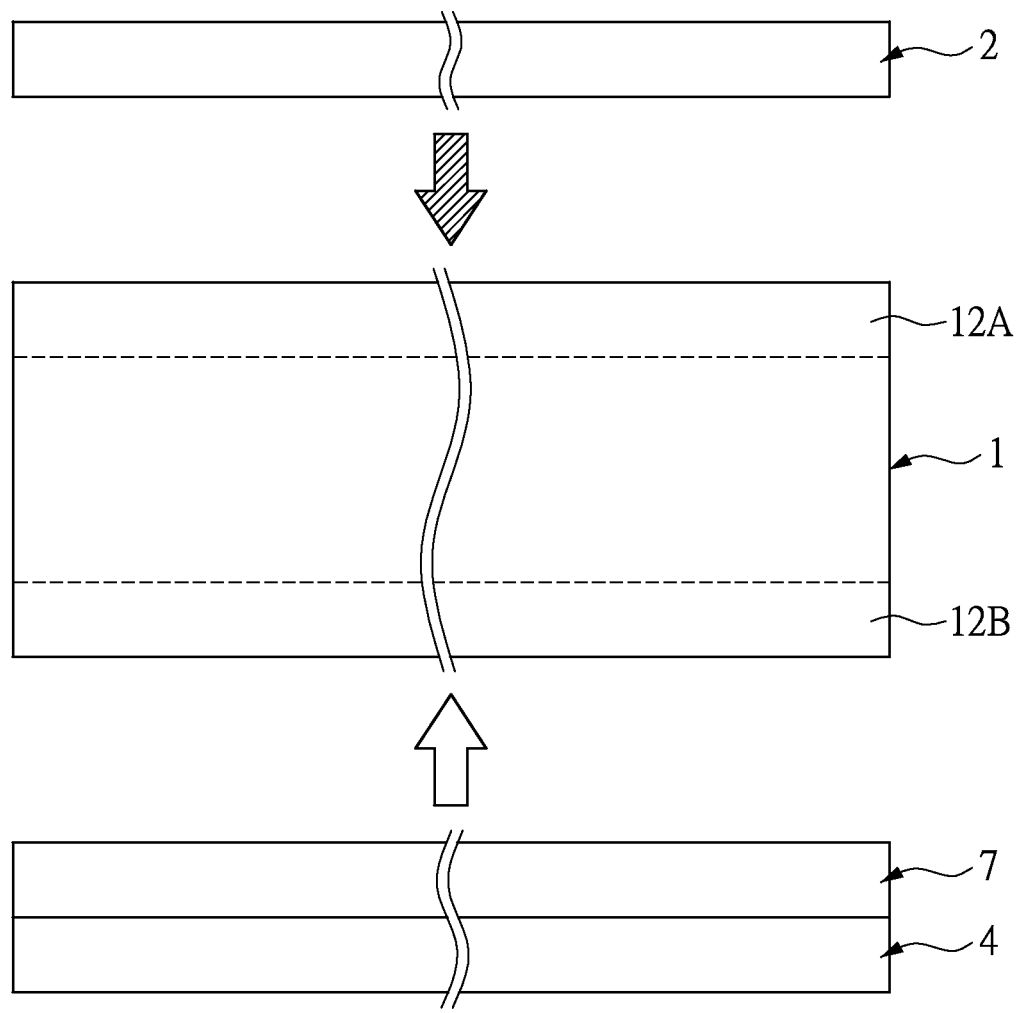
FIG. 6B shows a lateral, schematic view of the method of manufacturing an electromagnetic induction panel structure according to the fifth embodiment of the instant disclosure.
Figure 6C:
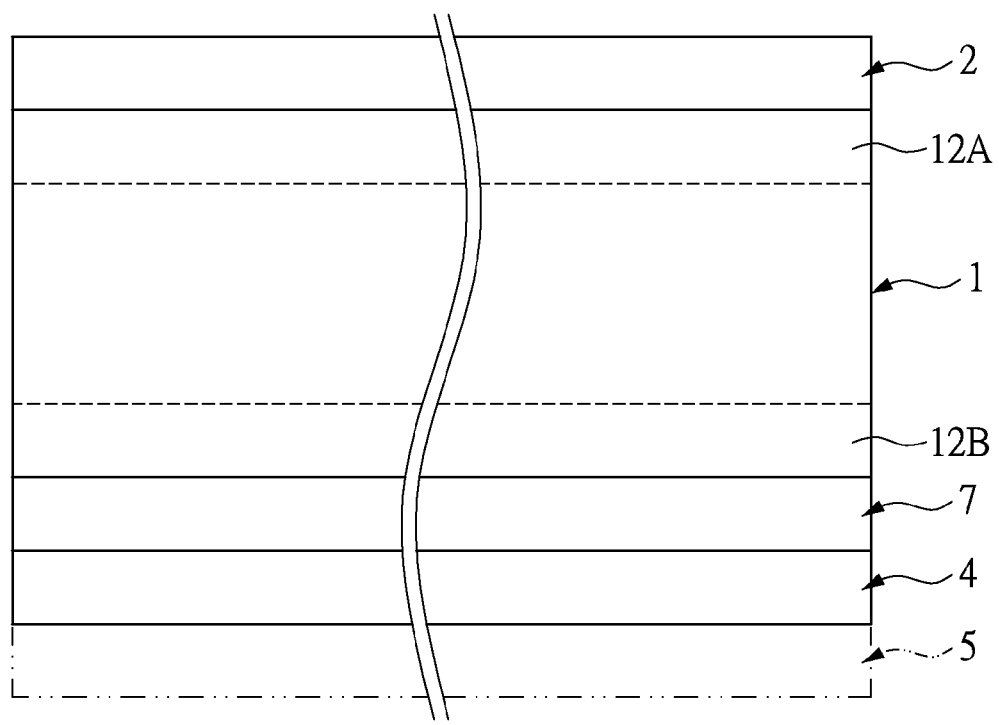
FIG. 6C shows a lateral, schematic view of the electromagnetic induction panel structure according to the fifth embodiment of the instant disclosure.

Referring to FIG. 1 and FIG. 6A to FIG. 6C, where the fifth embodiment of the instant disclosure provides a method of manufacturing an electromagnetic induction panel structure M, comprising the steps of: referring to FIG. 1, providing a multilayer substrate 1 including a first outermost lateral conductive layer 12A and a second outermost lateral conductive layer 12B respectively disposed on two opposite outermost surfaces of the multilayer substrate 1 (S500); referring to FIG. 6B and FIG. 6C, directly forming a first insulating layer 2 on the first outermost lateral conductive layer 12A of the multilayer substrate 1 by coating, printing or any other forming method (shown as the solid arrow in FIG. 6B) for directly contacting the first outermost lateral conductive layer 12A of the multilayer substrate 1 (S502); and then referring to FIG. 6B and FIG. 6C, adhesively disposing a wave-absorbing material layer 4 on the second outmost lateral conductive layer 12B of the multilayer substrate 1 through a second adhesive layer 7 having an insulation property (shown as the hollow arrow in FIG. 6B) for placing the second insulating layer 7 disposed between the wave-absorbing material layer 4 and the second outmost lateral conductive layer 12B of the multilayer substrate 1 (S504). However, the above-mentioned method of the fifth embodiment is merely an example and is not meant to limit the instant disclosure. For example, the steps of S502 and S504 can be interchanged with each other.

Referring to FIG. 1, FIG. 6B and FIG. 6C, the fifth embodiment of the instant disclosure can provide an electromagnetic induction panel structure M through the steps from S500 to S504. The electromagnetic induction panel structure M comprises a multilayer substrate 1, a first cover unit and a second cover unit. The multilayer substrate 1 includes a first outermost lateral conductive layer 12A and a second outermost lateral conductive layer 12B respectively disposed on two opposite outermost surfaces of the multilayer substrate 1. In addition, the first cover unit is disposed on the first outermost lateral conductive layer 12A of the multilayer substrate 1, and the first cover unit includes a first insulating layer 2 directly formed on the first outermost lateral conductive layer 12A of the multilayer substrate 1 without using any extra auxiliary adhesive layer for directly contacting the first outermost lateral conductive layer 12A of the multilayer substrate 1. Moreover, the second cover unit is disposed on the second outermost lateral conductive layer 12B of the multilayer substrate 1. The second cover unit includes a wave-absorbing material layer 4 adhesively disposed on the second outmost lateral conductive layer 12B of the multilayer substrate 1 through a second adhesive layer 7 having an insulation property, thus the second insulating layer 7 is disposed between the wave-absorbing material layer 4 and the second outmost lateral conductive layer 12B of the multilayer substrate 1. Furthermore, referring to FIG. 6C, the second cover unit further includes an insulating protection layer 5 (such as a UV paint or any insulation layer) directly formed on the wave-absorbing material layer 4 for protecting the wave-absorbing material layer 4 and preventing the wave-absorbing material layer 4 from being damaged.

More precisely, in the fifth embodiment, because the first insulating layer 2 can be directly formed on the first outermost lateral conductive layer 12A of the multilayer substrate 1 without using any extra auxiliary adhesive layer, there is no any extra auxiliary adhesive layer used between the first insulating layer 2 and the first outermost lateral conductive layer 12A. Thus, the fifth embodiment of the instant disclosure can omit an extra auxiliary adhesive layer (occupied by about 15 um) for decreasing the thickness of the electromagnetic induction panel structure M. In addition, because the wave-absorbing material layer 4 can be adhesively disposed on the second outmost lateral conductive layer 12B of the multilayer substrate 1 through the second adhesive layer 7 having an insulation property, the second outermost lateral conductive layer 12B and the wave-absorbing material layer 4 can share the same second adhesive layer 7. Thus, the fifth embodiment of the instant disclosure can omit an extra adhesive layer (occupied by about 15 um) for decreasing the thickness of the electromagnetic induction panel structure M. In other words, the first insulating layer 2 can be directly formed on the first outermost lateral conductive layer 12A of the multilayer substrate 1 without using any extra auxiliary adhesive layer and the wave-absorbing material layer 4 can be adhesively disposed on the second outmost lateral conductive layer 12B of the multilayer substrate 1 through the second adhesive layer 7 having an insulation property, so that the fifth embodiment of the instant disclosure can omit two extra auxiliary adhesive layers (occupied by about 30 um) for reducing the thickness of the electromagnetic induction panel structure M, so as to achieve the miniaturization requirement.

Sixth Embodiment

Figure 7A:
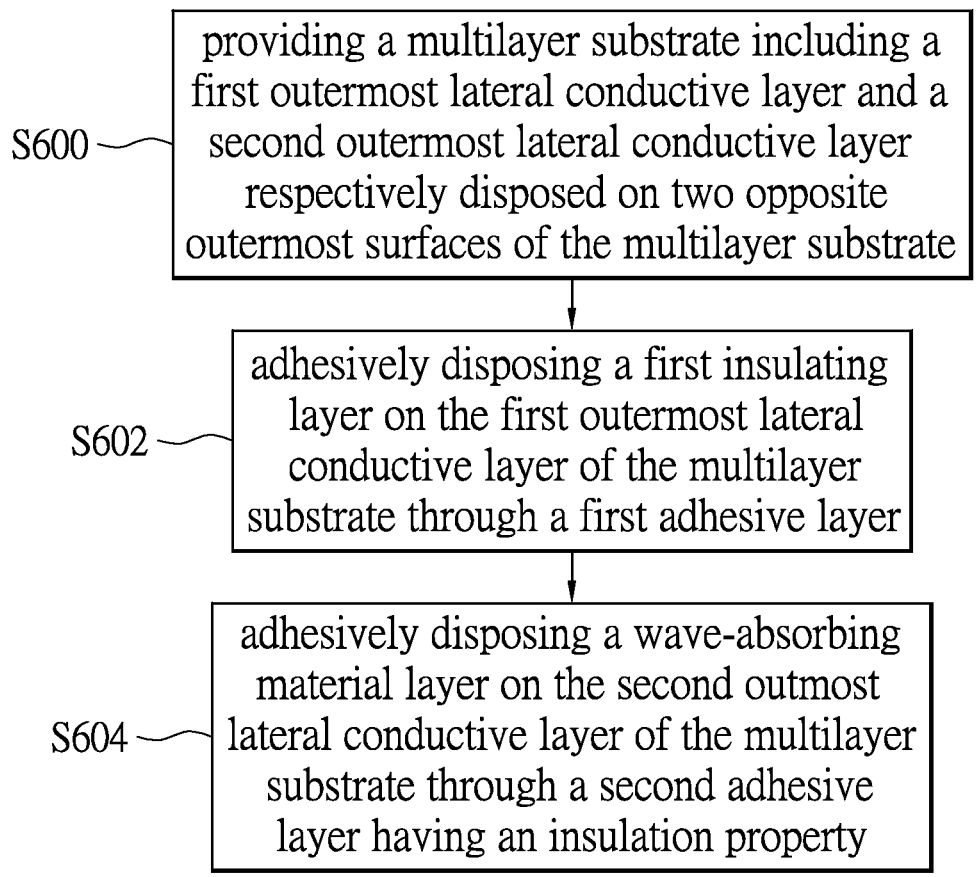
FIG. 7A shows a flowchart of the method of manufacturing an electromagnetic induction panel structure according to the sixth embodiment of the instant disclosure.
Figure 7B:
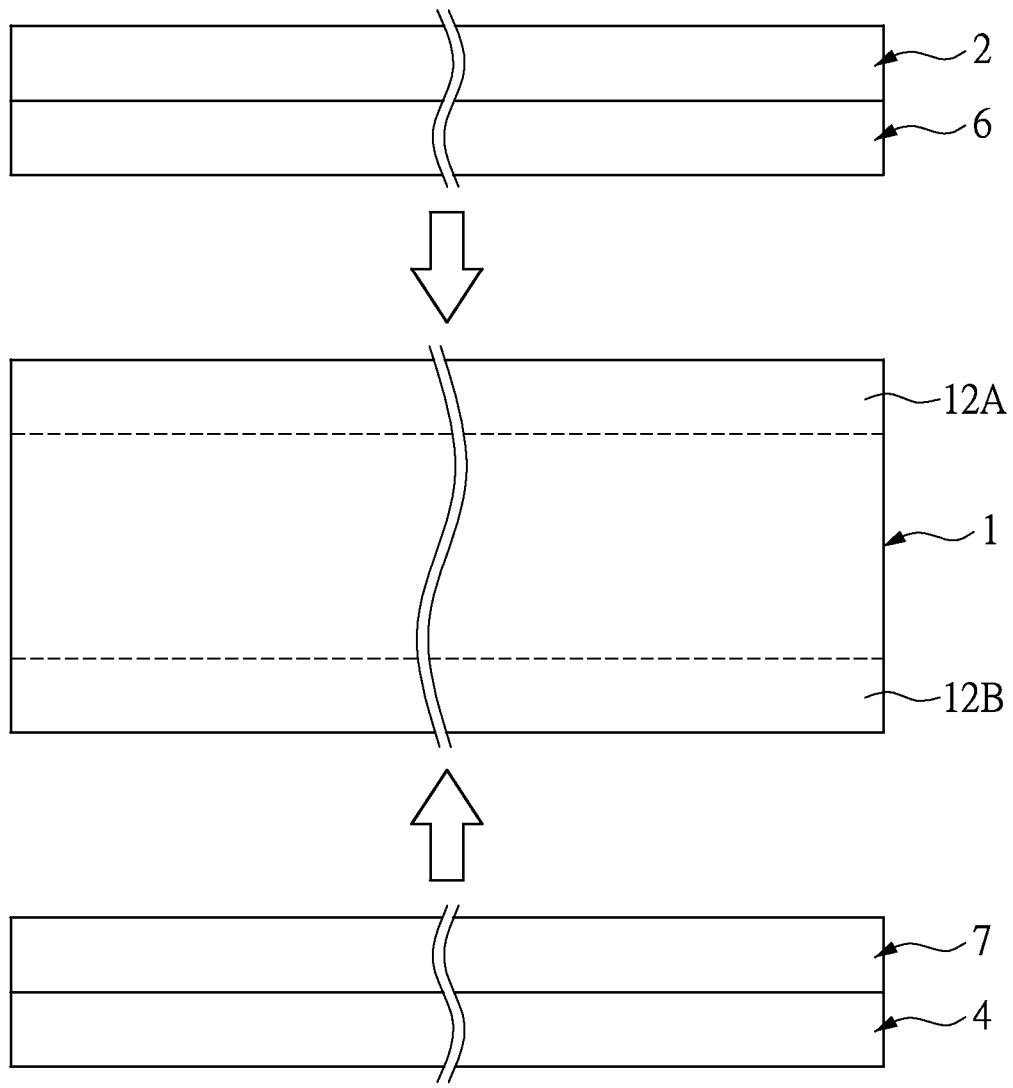
FIG. 7B shows a lateral, schematic view of the method of manufacturing an electromagnetic induction panel structure according to the sixth embodiment of the instant disclosure.
Figure 7C:
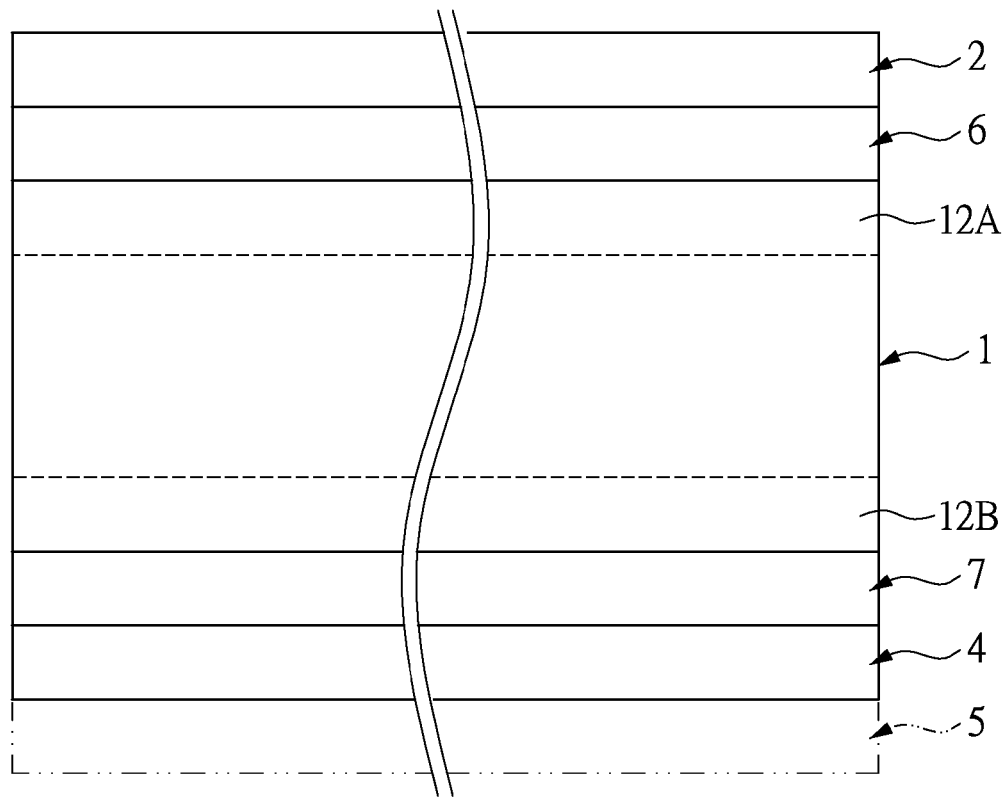
FIG. 7C shows a lateral, schematic view of the electromagnetic induction panel structure according to the sixth embodiment of the instant disclosure.

Referring to FIG. 1 and FIG. 7A to FIG. 7C, where the sixth embodiment of the instant disclosure provides a method of manufacturing an electromagnetic induction panel structure M, comprising the steps of: referring to FIG. 1, providing a multilayer substrate 1 including a first outermost lateral conductive layer 12A and a second outermost lateral conductive layer 12B respectively disposed on two opposite outermost surfaces of the multilayer substrate 1 (S600); referring to FIG. 7B and FIG. 7C, adhesively disposing a first insulating layer 2 on the first outermost lateral conductive layer 12A of the multilayer substrate 1 through a first adhesive layer 6 (shown as the hollow arrow in FIG. 7B) for placing the first adhesive layer 6 between the first insulating layer 2 and the first outermost lateral conductive layer 12A of the multilayer substrate 1 (S602); and then referring to FIG. 7B and FIG. 7C, adhesively disposing a wave-absorbing material layer 4 on the second outmost lateral conductive layer 12B of the multilayer substrate 1 through a second adhesive layer 7 having an insulation property (shown as the hollow arrow in FIG. 7B) for placing the second insulating layer 7 disposed between the wave-absorbing material layer 4 and the second outmost lateral conductive layer 12B of the multilayer substrate 1 (S604). However, the above-mentioned method of the fifth embodiment is merely an example and is not meant to limit the instant disclosure. For example, the steps of S602 and S604 can be interchanged with each other.

Furthermore, comparing FIG. 7B with FIG. 6B, and comparing FIG. 7C with FIG. 6C, the difference between the sixth embodiment and the fifth embodiment is as follows: in the sixth embodiment, the first cover unit includes a first insulating layer 2 adhesively disposed on the first outermost lateral conductive layer 12A of the multilayer substrate 1 through a first adhesive layer 6, thus the first adhesive layer 6 is disposed between the first insulating layer 2 and the first outermost lateral conductive layer 12A of the multilayer substrate 1.

Seventh Embodiment

Figure 8:
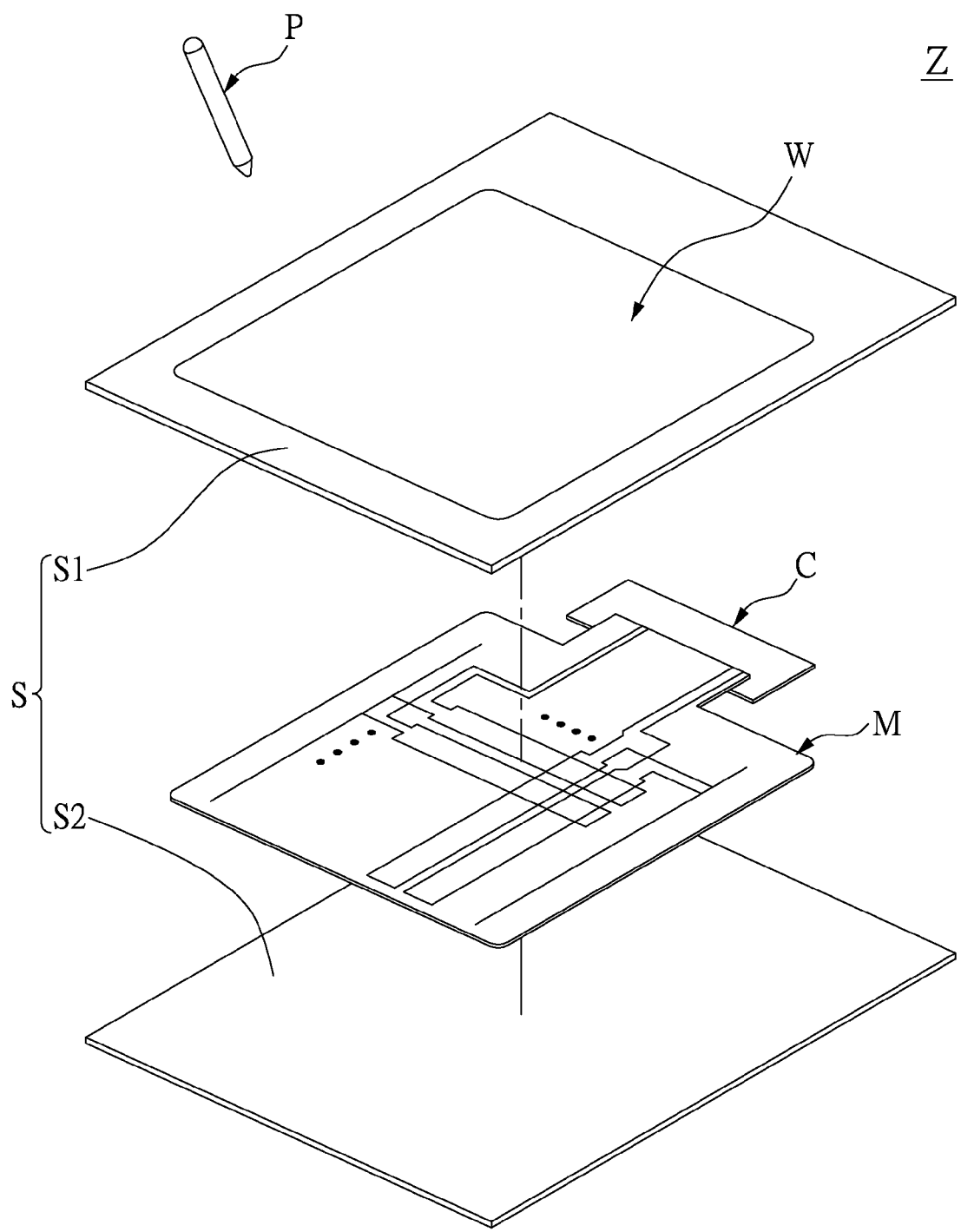
FIG. 8 shows an exploded, schematic view of the electromagnetic handwriting input device according to the seventh embodiment of the instant disclosure.
Figure 9:
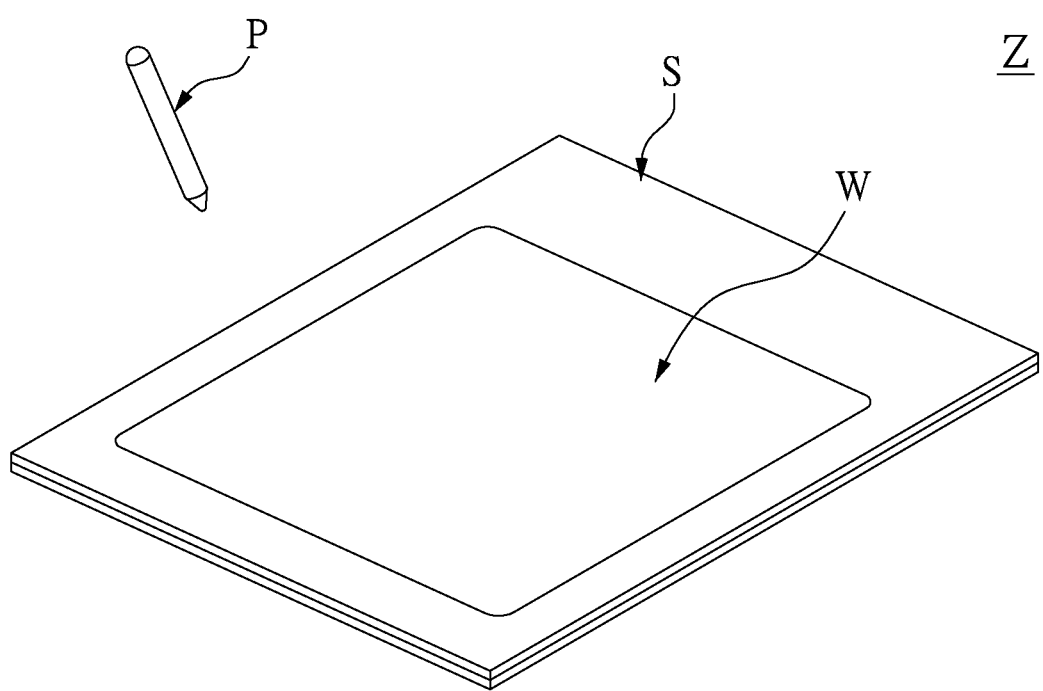
FIG. 9 shows an assembled, schematic view of the electromagnetic handwriting input device according to the seventh embodiment of the instant disclosure.

Referring to FIG. 8 and FIG. 9, where the seventh embodiment of the instant disclosure provides an electromagnetic handwriting input device Z, comprising: an external casing S, a control circuit board C and an electromagnetic induction panel structure M. More precisely, the external casing S has a writing surface W (such as writing area) formed on the external casing S for an electromagnetic pen P to write on the writing surface W. In addition, an emitting electromagnetic wave directly generated by the electromagnetic pen P or a reflected electromagnetic wave indirectly generated from the electromagnetic pen P can be detected by the electromagnetic induction panel structure M to obtain an electromagnetic wave signal. Moreover, the control circuit board C is electrically connected to the electromagnetic induction panel structure M for receiving the electromagnetic wave signal of the electromagnetic induction panel structure M, and both the electromagnetic induction panel structure M and the control circuit board C are disposed inside the external casing S. More precisely, the external casing S can be composed of a top casing 51 and a bottom casing S2 mated with the top casing 51, but it is merely an example and is not meant to limit the instant disclosure. For example, the external casing S may be made of silicone rubber or any flexible material.

It's worth mentioning that not only the electromagnetic induction panel structures M from the first embodiment to the sixth embodiment can be applied to the electromagnetic handwriting input device Z, but also the electromagnetic induction panel structures M from the first embodiment to the sixth embodiment can be applied to any type of digitizing tablet or handwritten board.

In conclusion, the multilayer substrate 1 includes a first outermost lateral conductive layer 12A and a second outermost lateral conductive layer 12B, the first cover unit includes a first insulating layer 2 directly formed on the first outermost lateral conductive layer 12A for directly contacting the first outermost lateral conductive layer 12A, and the second cover unit includes a second insulating layer 3 directly formed on the second outermost lateral conductive layer 12B for directly contacting the second outermost lateral conductive layer 12B (or the second cover unit includes a second insulating layer 3 adhesively disposed on the second outermost lateral conductive layer 12B through a second adhesive layer 7, or the wave-absorbing material layer 4 is adhesively disposed on the second outmost lateral conductive layer 12B through a second adhesive layer 7 having an insulation property for placing the second insulating layer 7 between the wave-absorbing material layer 4 and the second outmost lateral conductive layer 12B), so that the whole thickness of the electromagnetic handwriting input device Z using the electromagnetic induction panel structure M can be decreased for achieving the miniaturization requirement.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. An electromagnetic induction panel structure, comprising:
   a multilayer substrate including an insulating base layer, a first conductive circuit layer disposed on a first surface of the insulating base layer, a second conductive circuit layer disposed on a second surface of the insulating base layer, wherein the first surface is opposite the second surface, a first outermost lateral conductive layer disposed directly on the first conductive circuit layer, and a second outermost lateral conductive layer disposed directly on the second conductive circuit layer;
   a first cover unit disposed on the first outermost lateral conductive layer of the multilayer substrate; and
   a second cover unit disposed on the second outermost lateral conductive layer of the multilayer substrate, wherein the second cover unit includes a wave-absorbing material layer.

2. The electromagnetic induction panel structure of claim 1, wherein the first cover unit includes a first insulating layer directly formed on the first outermost lateral conductive layer of the multilayer substrate, the first insulating layer directly contacting the first outermost lateral conductive layer of the multilayer substrate.

3. The electromagnetic induction panel structure of claim 1, wherein the first cover unit includes a first insulating layer adhesively disposed on the first outermost lateral conductive layer of the multilayer substrate through a first adhesive layer, the first adhesive layer being disposed between the first insulating layer and the first outermost lateral conductive layer of the multilayer substrate.

4. The electromagnetic induction panel structure of claim 1, wherein the second cover unit includes a second insulating layer directly formed on the second outermost lateral conductive layer of the multilayer substrate, the second insulating layer directly contacting the second outermost lateral conductive layer of the multilayer substrate, and wherein the wave-absorbing material layer is directly formed on the second insulating layer, the wave-absorbing material layer directly contacting the second insulating layer.

5. The electromagnetic induction panel structure of claim 1, wherein the second cover unit includes a second insulating layer adhesively disposed on the second outermost lateral conductive layer of the multilayer substrate through a second adhesive layer, the second adhesive layer being disposed between the second insulating layer and the second outmost lateral conductive layer of the multilayer substrate, and wherein the wave-absorbing material layer is directly formed on the second insulating layer for directly contacting the second insulating layer.

6. The electromagnetic induction panel structure of claim 1, wherein the wave-absorbing material layer is adhesively disposed on the second outmost lateral conductive layer of the multilayer substrate through a second adhesive layer having an insulation property, thus the second insulating layer is disposed between the wave-absorbing material layer and the second outmost lateral conductive layer.

7. The electromagnetic induction panel structure of claim 1, wherein the multilayer substrate is a flexible circuit board, and both the first outmost lateral conductive layer and the second outmost lateral conductive layer are two electroplating layers, wherein the first cover unit includes a first insulating layer, and the second cover unit includes a second insulating layer and an insulating protection layer directly formed on the wave-absorbing material layer for protecting the wave-absorbing material layer.

8. The electromagnetic induction panel structure of claim 7, wherein the first insulating layer, the second insulating layer and the insulating base layer are made of one of polymethylmethacrylate (PMMA), poly vinyl chloride (PVC), polyethylene terephthalate (PET), polyethylene naphthalate (PEN), cyclic olefin copolymer (COC), poly carbonate (PC), polyethylene (PE), poly propylene (PP), polyimide (PI) and poly styrene (PS), wherein both the first conductive circuit layer and the second conductive circuit layer are two copper foil layers, two indium tin oxide conductive layers, two carbon nanotube conductive layers, two polymer conductive layers, two grapheme conductive layers, two silver paste layers or two nano silver conductive layers.

9. The electromagnetic induction panel structure of claim 1, further comprising:
   an external casing having a writing surface formed thereon for an electromagnetic pen to write on the writing surface, wherein an emitting electromagnetic wave directly generated by the electromagnetic pen or a reflected electromagnetic wave indirectly generated from the electromagnetic pen is detected by the electromagnetic induction panel structure to obtain an electromagnetic wave signal; and a control circuit board electrically connected to the electromagnetic induction panel structure for receiving the electromagnetic wave signal of the electromagnetic induction panel structure, wherein both the electromagnetic induction panel structure and the control circuit board are disposed inside the external casing.

10. The electromagnetic induction panel structure of claim 9, wherein the first cover unit includes a first insulating layer directly formed on the first outermost lateral conductive layer of the multilayer substrate for directly contacting the first outermost lateral conductive layer of the multilayer substrate.

11. The electromagnetic induction panel structure of claim 9, wherein the first cover unit includes a first insulating layer adhesively disposed on the first outermost lateral conductive layer of the multilayer substrate through a first adhesive layer, thus the first adhesive layer is disposed between the first insulating layer and the first outermost lateral conductive layer of the multilayer substrate.

12. The electromagnetic induction panel structure of claim 9, wherein the second cover unit includes a second insulating layer directly formed on the second outermost lateral conductive layer of the multilayer substrate for directly contacting the second outermost lateral conductive layer of the multilayer substrate, and the wave-absorbing material layer is directly formed on the second insulating layer for directly contacting the second insulating layer.

13. The electromagnetic induction panel structure of claim 9, wherein the second cover unit includes a second insulating layer adhesively disposed on the second outermost lateral conductive layer of the multilayer substrate through a second adhesive layer, thus the second adhesive layer is disposed between the second insulating layer and the second outmost lateral conductive layer of the multilayer substrate, wherein the wave-absorbing material layer is directly formed on the second insulating layer for directly contacting the second insulating layer.

14. The electromagnetic induction panel structure of claim 9, wherein the wave-absorbing material layer is adhesively disposed on the second outmost lateral conductive layer of the multilayer substrate through a second adhesive layer having an insulation property, thus the second insulating layer is disposed between the wave-absorbing material layer and the second outmost lateral conductive layer.

15. A method of manufacturing an electromagnetic induction panel structure, comprising:
disposing a first cover unit on a first outermost lateral conductive layer of a multilayer substrate, wherein the multilayer substrate includes an insulating base layer, a first conductive circuit layer disposed on a first surface of the insulating base layer, a second conductive circuit layer disposed on a second surface of the insulating base layer, wherein the first surface is opposite the second surface, the first outermost lateral conductive layer disposed directly on the first conductive circuit layer, and a second outermost lateral conductive layer disposed directly on the second conductive circuit layer; and disposing a second cover unit on the second outermost lateral conductive layer of the multilayer substrate, wherein the second cover unit includes a wave-absorbing material layer.

16. The method of claim 15, wherein the disposing the first cover unit on the first outermost lateral conductive layer of the multilayer substrate comprises: directly forming a first insulating layer of the first cover unit on the first outermost lateral conductive layer of the multilayer substrate for directly contacting the first outermost lateral conductive layer of the multilayer substrate.

17. The method of claim 15, wherein the disposing the first cover unit on the first outermost lateral conductive layer of the multilayer substrate comprises: adhesively disposing a first insulating layer of the first cover unit on the first outermost lateral conductive layer of the multilayer substrate through a first adhesive layer, wherein the first adhesive layer is disposed between the first insulating layer and the first outermost lateral conductive layer of the multilayer substrate.

18. The method of claim 15, wherein the disposing the second cover unit on the second outermost lateral conductive layer of the multilayer substrate comprises:
directly forming a second insulating layer of the second cover unit on the second outermost lateral conductive layer of the multilayer substrate, the second insulating layer of the second cover unit directly contacting the second outermost lateral conductive layer of the multilayer substrate; and
directly forming the wave-absorbing material layer on the second insulating layer, the wave-absorbing material layer directly contacting the second insulating layer.

19. The method of claim 15, wherein the disposing the second cover unit on the second outermost lateral conductive layer of the multilayer substrate comprises: adhesively disposing a prefabricated three-layer structure on the second outermost lateral conductive layer of the multilayer substrate, wherein the prefabricated three-layer structure is composed of a second adhesive layer, a second insulating layer and the wave-absorbing material layer that are stacked on top of one another, and the second adhesive layer is disposed between the second insulating layer and the second outmost lateral conductive layer of the multilayer substrate.

20. The method of claim 15, wherein the disposing the second cover unit on the second outermost lateral conductive layer of the multilayer substrate comprises: adhesively disposing the wave-absorbing material layer on the second outmost lateral conductive layer of the multilayer substrate through a second adhesive layer having an insulation property, wherein the second insulating layer is disposed between the wave-absorbing material layer and the second outmost lateral conductive layer.

\* \* \* \* \*